United States Patent
Krishna (10) Patent No.: US 9,444,850 B2
(45) Date of Patent: Sep. 13, 2016

(54) SEEDING OF MOBILE APPLICATION MANAGEMENT POLICIES

(71) Applicant: CA, INC., New York, NY (US)

(72) Inventor: Vikas Krishna, San Jose, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/610,333

(22) Filed: Jan. 30, 2015

(65) Prior Publication Data
US 2016/0226910 A1    Aug. 4, 2016

(51) Int. Cl.
H04L 29/06    (2006.01)

(52) U.S. Cl.
CPC ............. *H04L 63/20* (2013.01); *H04L 63/10* (2013.01)

(58) Field of Classification Search
CPC ....... H01L 63/20; H01L 63/10; H01L 63/08; H01L 63/14; H01L 63/1425; H01L 63/1433; H04W 12/08; H04W 12/00; H04M 15/00; H04M 15/58; H04M 15/88; G06F 21/62
USPC .......................................................... 726/1
See application file for complete search history.

(56) References Cited

U.S. PATENT DOCUMENTS

| | | | |
|---|---|---|---|
| 2013/0291055 A1* | 10/2013 | Muppidi | H04L 63/20 726/1 |
| 2013/0347094 A1* | 12/2013 | Bettini | H04L 63/0227 726/11 |
| 2014/0007222 A1* | 1/2014 | Qureshi | G06F 21/10 726/16 |

* cited by examiner

*Primary Examiner* — Yogesh Paliwal
(74) *Attorney, Agent, or Firm* — Myers Bigel & Sibley, P.A.

(57) ABSTRACT

A method includes performing operations as follows on a processor: monitoring use of resources in an enterprise by mobile devices, receiving metrics from the mobile devices and an enterprise server, the metrics being associated with the use of the resources in the enterprise based on monitoring the use of the resources, and automatically generating a policy that restricts use of the resources in the enterprise based on the metrics, a predicted user productivity cost associated with the policy, and a predicted security cost associated with the mobile devices when the policy is not enforced.

17 Claims, 6 Drawing Sheets

SEEDING OF MOBILE APPLICATION MANAGEMENT POLICIES

BACKGROUND

The present disclosure relates to computing systems, and, in particular, to security management of mobile devices and improving productivity when using mobile devices and/or applications.

Mobile Application Management (MAM) may involve security measures to protect applications and data on mobile devices. For example, an enterprise may adopt policies that include restrictions on invoking certain applications or accessing certain types of data or files to ensure that sensitive information is not compromised. These restrictions may include operation limitations, geo fence limitations, time of day/week limitations, access limitations, etc. The policies may also include requirements that various applications and/or other software components, such as operating systems, be upgraded before certain applications and/or data can be used. While such policies have a valid purpose in enhancing the security of mobile devices, the policies may be conceived and implemented with little input or participation of the end user. When creating a policy, a MAM administrator may not be aware that the policy may negatively impact and/or prevent one or more end-users from doing their work. Conversely, when an end-user is planning work that involves using applications, content, and/or data that are under MAM management or supervision, the end user may not be aware that such work may be affected by one or more MAM policies.

SUMMARY

In some embodiments of the inventive subject matter, a method comprises performing operations as follows on a processor: monitoring use of resources in an enterprise by mobile devices, receiving metrics from the mobile devices and an enterprise server, the metrics being associated with the use of the resources in the enterprise based on monitoring the use of the resources, and automatically generating a policy that restricts use of the resources in the enterprise based on the metrics, a predicted user productivity cost associated with the policy, and a predicted security cost associated with the mobile devices when the policy is not enforced.

In still other embodiments of the inventive subject matter, a system comprises a processor and a memory coupled to the processor, which comprises computer readable program code embodied in the memory that when executed by the processor causes the processor to perform operations comprising: monitoring use of resources in an enterprise by mobile devices, receiving metrics from the mobile devices and an enterprise server, the metrics being associated with the use of the resources in the enterprise based on monitoring the use of the resources, and automatically generating a policy that restricts use of the resources in the enterprise based on the metrics, a predicted user productivity cost associated with the policy, and a predicted security cost associated with the mobile devices when the policy is not enforced.

In still other embodiments of the inventive subject matter, a computer program product comprises a tangible computer readable storage medium comprising computer readable program code embodied in the medium that when executed by a processor causes the processor to perform operations comprising: monitoring use of resources in an enterprise by mobile devices, receiving metrics from the mobile devices and an enterprise server, the metrics being associated with the use of the resources in the enterprise based on monitoring the use of the resources, and automatically generating a policy that restricts use of the resources in the enterprise based on the metrics, a predicted user productivity cost associated with the policy, and a predicted security cost associated with the mobile devices when the policy is not enforced.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

As used herein an enterprise resource may include, but is not limited to, data, content, information, software, firmware, a hardware device or system, and a hardware device or system programmed with software and/or firmware.

Some embodiments of the inventive subject matter stem from a realization that a policy generation engine may be used to analyze how users use the resources of an enterprise. Based on the analysis, a baseline may be established for the various user activities. A policy generation engine may then use this activity baseline to establish one or more seed policies for the enterprise. Activities that deviate from those authorized by the seed policies may be restricted or forbidden. The policies may be customized for classes of users, e.g., engineering staff, sales staff, financial staff, customers, etc., or, in some embodiments, for individual users. Changes or exceptions to the seed policies may be made based on requests from users or data collected over time indicating that a particular policy incurs too great of a productivity cost for the security benefit or, vice versa, that the policy results in too great of a security risk based on the productivity benefit.

Figure 1:
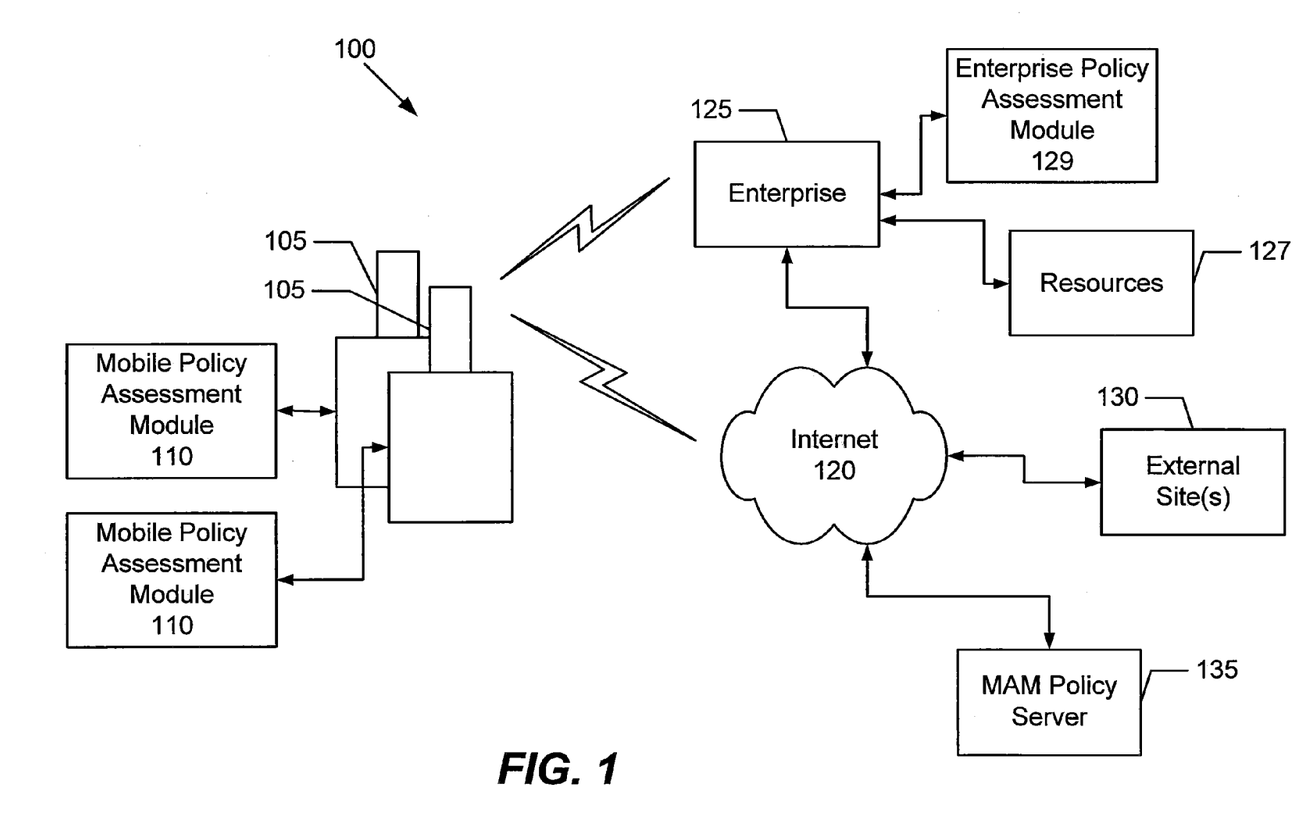
FIG. 1 is a block diagram of a system for seeding Mobile Application Management (MAM) policies in an enterprise in accordance with some embodiments of the inventive subject matter.

FIG. 1 is a block diagram of a system for seeding Mobile Application Management (MAM) policies in an enterprise in accordance with some embodiments of the inventive subject matter. Employees and/or customers of an enterprise, for example, may use mobile devices, such as smart phones, tablets, laptops, and the like to access various types of content and data belonging to the enterprise. As shown in FIG. 1, mobile devices 105 may be used to communicate with an enterprise 125 using a direct wireless connection or via various networks, which are represented by the Internet 120. In addition to communicating with the enterprise 125, the mobile device may also communicate with other external site(s) 130 to run application(s) and/or exchange data and content therewith. Because mobile devices are typically more susceptible to being stolen, lost, or compromised versus desktop computing devices, the enterprise 125 may wish to adopt one or more MAM policies that govern the use of mobile devices 105 in the enterprise by imposing various restrictions on the use of the mobile devices including, for example, operational limitations, geo fence limitations, time of day/week limitations, and/or access limitations.

To develop an initial set of one or more policies, the MAM policy server 135 may download mobile policy assessment modules 110 to the mobile devices 105 and an enterprise policy assessment module 129 to the enterprise 125. The enterprise policy assessment module 129 may be distributed to the various servers in the enterprise 125 to monitor and collect metrics on the use of the enterprise resources 127. Similarly, the mobile policy assessment modules 110 may monitor and collect metrics on the use of the enterprise resources by the mobile devices 105. It will be understood that enterprise resources 127 may be used even when mobile devices 105 access resources external to the enterprise, such as the external sites 130. The MAM policy server 135 may be configured to receive the metrics from the mobile devices 105 and one or more servers in the enterprise 125 to generate one or more MAM policies for the enterprise that restricts the use of the resources 127 by the mobile devices 105 based on the metrics, a predicted user productivity cost associated with the policy, and a predicted security cost associated with the use of the enterprise resources by the mobile devices 105 when the one or more policies are not enforced. Once a MAM policy is in place, the mobile policy assessment modules 110 and the enterprise policy assessment module 129 may continue to monitor the use of the resources 127 and collect metrics for the MAM policy server 135, which can be used to generate a score indicative of the user productivity cost associated with the policy. Such a score can be compared with a score that is indicative of a security cost associated with the mobile devices when the policy is not enforced and a recommendation can be made whether to enforce and/or modify the policy. A MAM policy may be applicable to all users of mobile devices, certain classes of users of the mobile devices, e.g., users with specific roles or functions, such as engineering staff, sales staff, financial staff, customers, etc., or a policy may be applicable to a single user.

As shown in FIG. 1, the connections between the enterprise 125, external sites 130, MAM policy server 135, and the mobile device 105 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for seeding MAM policies in an enterprise according to some embodiments of the inventive subject matter it will be understood that embodiments of the present invention are not limited to such configurations, but are intended to encompass any configuration capable of carrying out the operations described herein.

Figure 2:
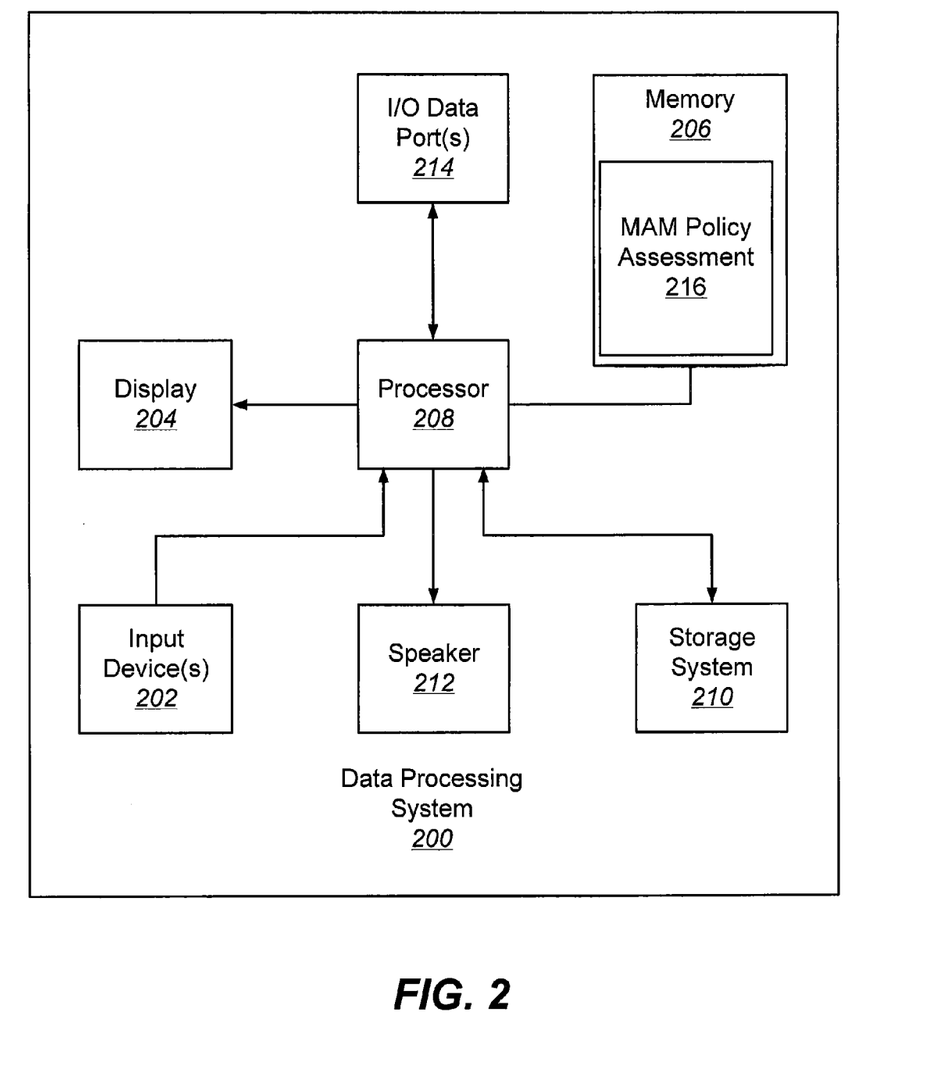
FIG. 2 illustrates a data processing system that may be used to implement the Mobile Application Management (MAM) policy server of FIG. 1 in accordance with some embodiments of the inventive subject matter.

Referring now to FIG. 2, a data processing system 200 that may be used to implement the MAM policy server 135 of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK or cloud storage. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a MAM policy assessment module 216 that may be configured to seed MAM policies in an enterprise according to some embodiments of the inventive subject matter.

Figure 3:
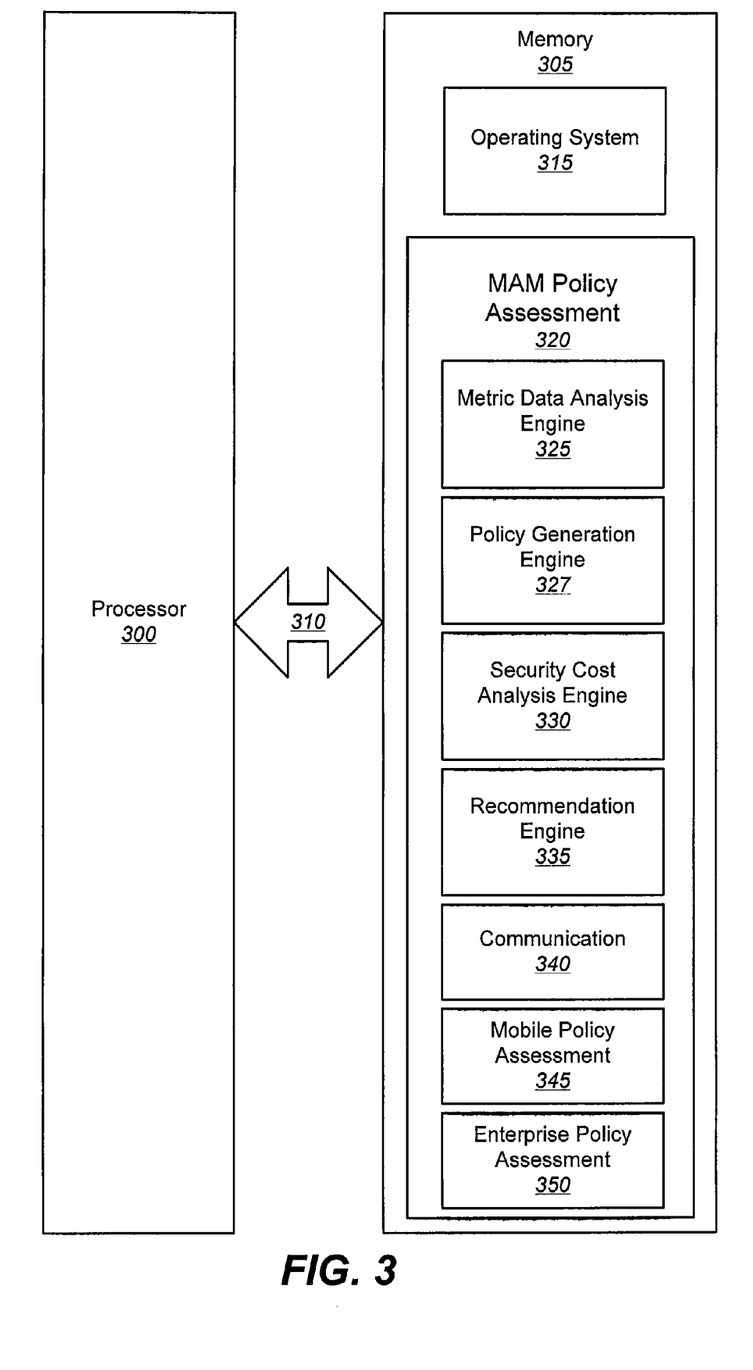
FIG. 3 is a block diagram that illustrates a software/hardware architecture for the MAM policy server of FIG. 1 in accordance with some embodiments of the present inventive subject matter.

FIG. 3 illustrates a processor 300 and memory 305 that may be used in embodiments of data processing systems, such as the MAM policy server 135 of FIG. 1 and the data processing system 200 of FIG. 2, respectively, for seeding MAM policies in an enterprise, according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for seeding MAM policies in an enterprise in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a MAM policy assessment module 320. The operating system 315 generally controls the operation of the data processing system. In particular, the operating system 315 may manage the data processing system's software and/or hardware resources and may coordinate execution of programs by the processor 300. The MAM policy assessment module 320 may be configured to receive quantitative and/or qualitative MAM policy metric data from a mobile policy assessment module 345 that is downloaded to mobile devices 105 in an enterprise and from an enterprise policy assessment module 350 that is downloaded to one or more enterprise servers or resources in an enterprise. The MAM policy assessment module 320 further comprises a metric data analysis engine 325, a policy generation engine 327, a security cost analysis engine 330, a recommendation engine 335, and a communication module 340.

The metric data analysis engine 325 may be configured to receive the quantitative and/or qualitative metric data from the mobile policy assessment modules 110 on the mobile devices 105 and from the enterprise policy assessment module(s) 129 on one or more enterprise servers. These quantitative metrics may include, but are not limited to, statistics regarding what enterprise resources 127 are used, how long the resources 127 are used, geographical locations of the mobile devices 105 when accessing the resources 127, month, day, and/or time of day that the resources 127 are accessed, amount and/or type of data or information exchanged when accessing the resources 127, bandwidth consumed when accessing the resources 127, and the like. The qualitative metrics may include feedback from users of the mobile devices 105 regarding use and/or access to the resources 127 and/or answers to survey questions provided to the users of the mobile devices 105. The mobile policy assessment module 110 may have a built-in qualitative feedback mechanism where the user can provide feedback to the MAM policy server 135 and/or answer survey questions and/or the mobile policy assessment module 110 may provide a link, such as a Uniform Resource Locator (URL), which the user can invoke to access a Web page, for example, to provide the qualitative feedback information.

The policy generation engine 327 may be configured to receive the metrics from the metric data analysis engine 325 to generate one or more MAM policies for the enterprise that restricts the use of the resources 127 by the mobile devices 105 based on the metrics, a predicted user productivity cost associated with the one or more policies, and a predicted security cost associated with the mobile devices 105 when the one or more policies are not enforced.

The security costs analysis engine 330 may be configured to generate an assessment based on a MAM policy that is indicative of a security cost associated with the mobile devices 105 when the MAM policy is not enforced in the enterprise. This assessment may be indicative of the potential cost of a breach in security with respect to the application/content/data, etc. that the MAM policy is used to protect.

In addition to generating one or more seed policies for the enterprise, embodiments of the inventive subject matter may also provide for continued monitoring of the use of enterprise resources 127 by the mobile devices 105 via the mobile policy assessment modules 110 and the enterprise policy assessment modules 129 to collect metrics through the metric data analysis engine 325 with one or more MAM policies being enforced in the enterprise. The recommendation engine 335 may use these metrics to generate scores based on the quantitative and/or qualitative metric data that is indicative of the user productivity cost associated with the one or more MAM policies. Scores may be generated separately for the quantitative and qualitative metric data along with a composite score that is based on both the quantitative and qualitative metric data scores. The recommendation engine 335 may also receive input from the security costs analysis engine 330 regarding the security cost associated with removal of the one or more MAM policies. The recommendation engine 335 may generate a score indicative of the security cost associated with removal (or non-enforcement) of the one or more MAM policies, which can be compared with the score(s) based on the quantitative and/or qualitative metric data indicative of the productivity cost associated with the one or more MAM policies to evaluate the efficacy of the one or more MAM policies and generate a recommendation whether to modify or cease enforcement of the one or more MAM policies or continue to enforce the one or more MAM policies in the enterprise. This recommendation can then be communicated to the enterprise 125 for use by information technology security personnel, for example.

The communication module 340 may be configured to facilitate communication between the MAM policy server 135 and other entities, such as the mobile devices 105 and enterprise 125.

Although FIG. 3 illustrates hardware/software architectures that may be used in data processing systems, such as the MAM policy server 135 of FIG. 1 and the data processing system 200 of FIG. 2, respectively, for seeding MAM policies in an enterprise according to some embodiments of the inventive subject matter, it will be understood that the present invention is not limited to such a configuration but is intended to encompass any configuration capable of carrying out operations described herein.

Figure 4:
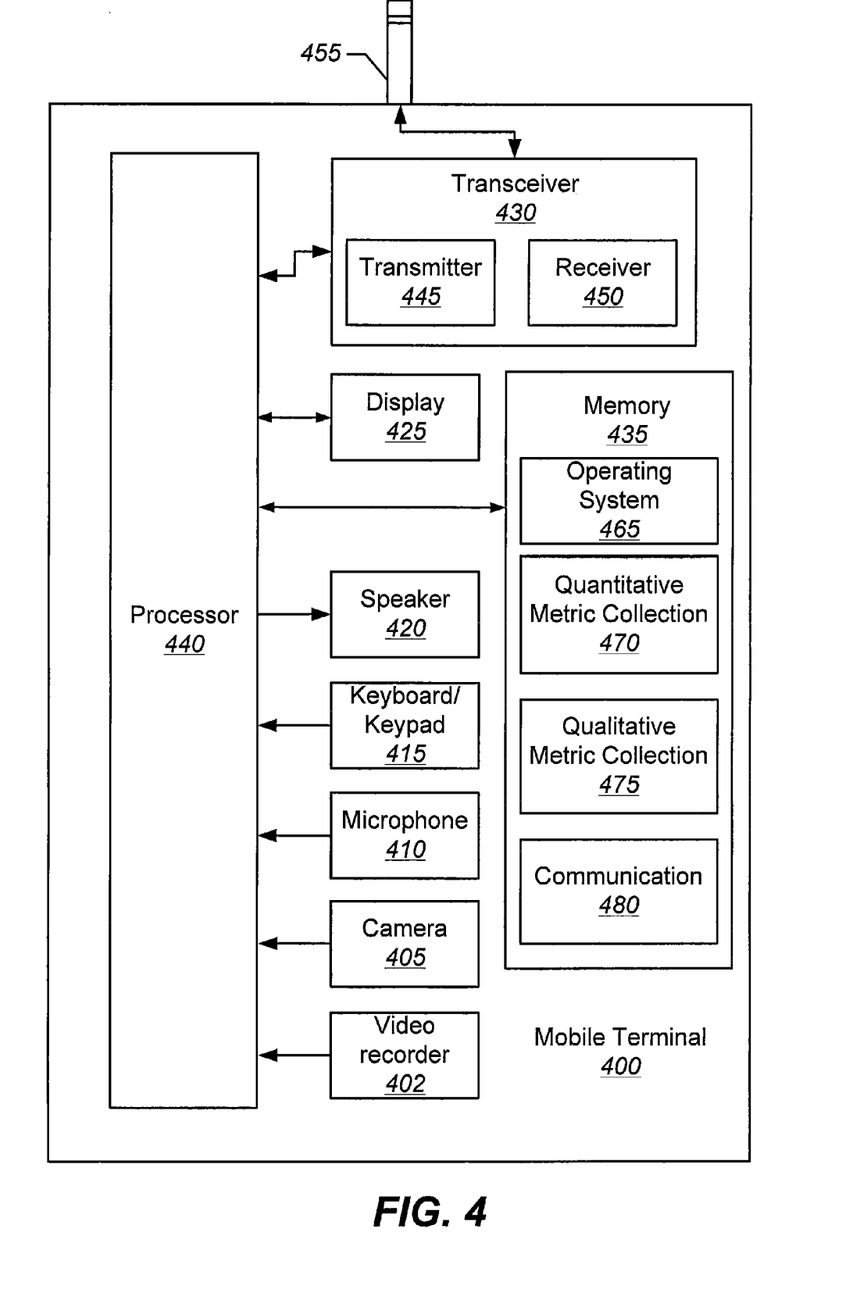
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminal 105 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used for seeding MAM policies in an enterprise in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to four or more categories of software and/or data: an operating system 465, a quantitative metric collection module 470, a qualitative metric collection module 475, and a communication module 480. The operating system 465 generally controls the operation of the mobile terminal 400. In particular, the operating system 465 may manage the mobile terminal's software and/or hardware resources and may coordinate execution of programs by the processor 440.

The quantitative metric collection module 470 and the qualitative metric collection module 475 may be used to implement the mobile policy assessment module 110 of FIG. 1. The quantitative metric collection module 470 may be configured to collect quantitative metric data associated with the use of the enterprise resources 127 by the mobile devices 105. These quantitative metrics may include, but are not limited to, statistics regarding what enterprise resources 127 are used, how long the resources 127 are used, geographical locations of the mobile devices 105 when accessing the resources 127, month, day, and/or time of day that the resources 127 are accessed, amount and/or type of data or information exchanged when accessing the resources 127, bandwidth consumed when accessing the resources 127, and the like.

The qualitative metric collection module 475 may be configured to collect qualitative metric data associated with the use of the enterprise resources 127 by the mobile devices 105. The qualitative metrics may include feedback from users of the mobile devices 105 regarding use and/or access to the resources 127 and/or answers to survey questions provided to the users of the mobile devices 105. The mobile policy assessment module 110 may have a built-in qualitative feedback mechanism where the user can provide feedback to the MAM policy server 135 and/or answer survey questions and/or the mobile policy assessment module 110 may provide a link, such as a Uniform Resource Locator (URL), which the user can invoke to access a Web page, for example, to provide the qualitative feedback information.

The communication module 480 may be configured to facilitate communication between the mobile terminal 105/400 and other entities, such as the enterprise 125, MAM policy server 135, and external site(s) 130.

Although FIG. 4 illustrates an exemplary software and hardware architecture that can receive a mobile policy assessment module 110 for storage thereon to collect quantitative and/or qualitative metric data associated with use of enterprise resources 127 for use in seeding MAM policies in the enterprise according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MAM policy server 135, data processing system 200, hardware/software architecture of FIG. 3, enterprise server 125, and mobile device 105/400 of FIGS. 1-4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system." It will be further understood that although FIGS. 1-3 illustrate the functionality of the MAM policy server 135 as a separate service to the enterprise 125, in other embodiments, the functionality of the MAM policy server 135 may be implemented as part of the data processing facilities of the enterprise 125.

Figure 5:
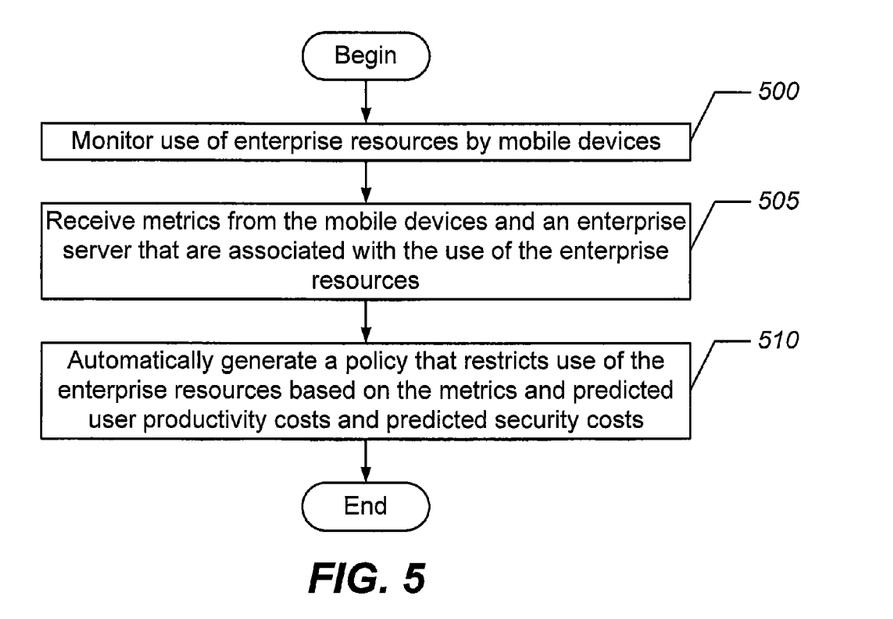
FIGS. 5-7 are flowcharts that illustrate operations for seeding MAM policies in an enterprise in accordance with some embodiments of the inventive subject matter.
Figure 6:
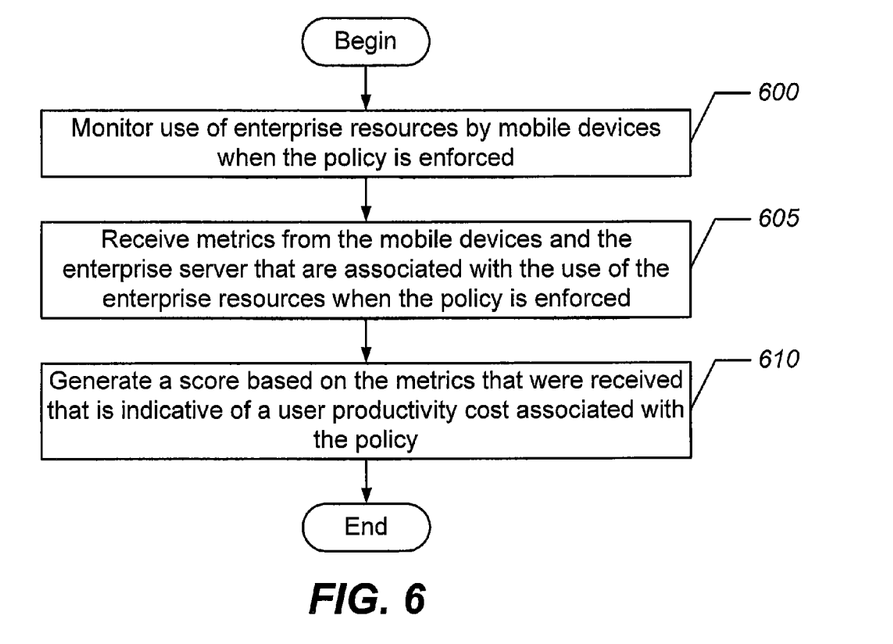
Figure 7:
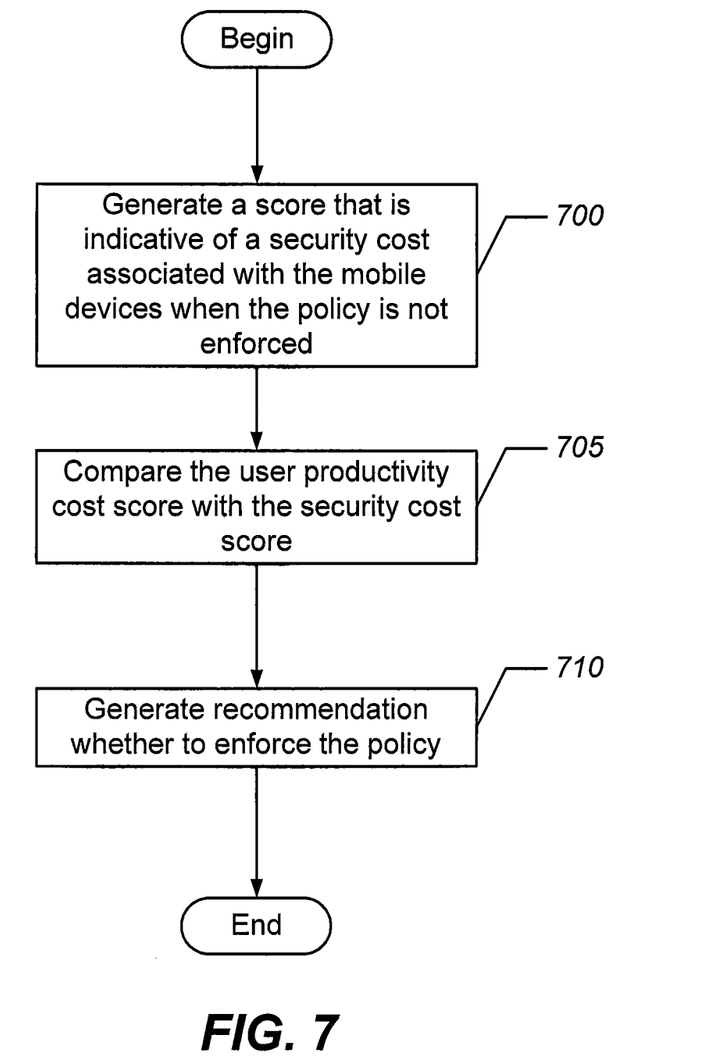

FIGS. 5-7 are flowcharts that illustrate operations for seeding MAM policies in an enterprise in accordance with some embodiments of the inventive subject matter. Referring to FIG. 5, operations begin at block 500 where the metric data analysis engine 325 on the MAM policy server 135 monitors the use of enterprise resources 127 through use of modules, such as the mobile policy assessment module 110 and the enterprise policy assessment module 129. The metric data analysis engine 325 receives metric data from the mobile policy assessment modules 110 and the enterprise policy assessment module 129 at block 505. The metric data may comprise quantitative metric data and/or qualitative metric data as described above. The policy generation engine 327 may, at block 510, automatically generate one or more MAM policies for the enterprise that restricts the use of the resources 127 by the mobile devices 105 based on the metrics, a predicted user productivity cost associated with the one or more policies, and a predicted security cost associated with the use of the resources 127 by the mobile devices 105 when the one or more policies are not enforced.

Referring now to FIG. 6, in addition to generating one or more seed policies for the enterprise, embodiments of the inventive subject matter may also provide for continued monitoring of the use of enterprise resources 127 by the mobile devices 105 via the mobile policy assessment modules 110 and the enterprise policy assessment modules 129 to collect metrics through the metric data analysis engine 325 with one or more MAM policies being enforced in the enterprise at block 600. At block 605, the metric data analysis engine 325 receives metric data from the mobile policy assessment modules 110 and the enterprise policy assessment module 129 at block 505 when the one or more MAM policies are enforced. The recommendation engine at block 610 may use the metrics to generate one or more scores based on the quantitative and/or qualitative metric data that are indicative of the user productivity cost associated with the one or more MAM policies. In some embodiments, for example, the recommendation engine 335 may generate a first scored based on the quantitative metric data that is indicative a user productivity cost associated with the one or more MAM policies and a second score based on the qualitative metric data that is indicative a user productivity cost associated with the one or more MAM policies. A score may then be generated by combining the first and second scores, which results in a composite score.

The score generated that is indicative of a user productivity cost associated with the one or more MAM policies may appear to indicate that the one or more MAM policies impose a relatively high cost in terms of user productivity. It may be useful, however, to consider the costs associated with risks incurred if the one or more MAM policies were not enforced in the enterprise. Referring to FIG. 7, operations begin at block 700 where the recommendation engine 335 receives input from the security costs analysis engine 330 regarding the security cost associated with removal or non-enforcement of the one or more MAM policies. The recommendation engine 335 may generate a score indicative of the security cost associated with removal (or non-enforcement) of the one or more MAM policies, which can be compared with the score(s) based on the quantitative and/or qualitative metric data indicative of the productivity cost associated with the one or more MAM policies at block 705 to evaluate the efficacy of the one or more MAM policies and generate a recommendation whether to modify or cease enforcement of the one or more MAM policies or continue to enforce the one or more MAM policies in the enterprise at block 710. This recommendation can then be communicated to the enterprise 125 for use by information technology security personnel, for example.

In addition to modifying or ceasing enforcement of one or more MAM policies based on the metrics received from the mobile devices 105 and the enterprise 125, users of the mobile devices 105 may also request a modification or non-enforcement of one or more MAM policies. The recommendation engine 335 may determine whether to grant the request based on a comparison of a productivity benefit associated with the request with a security cost associated with the request.

Embodiments of the present inventive subject matter may provide a MAM policy generation capability to generate one or more initial seed MAM policies for use of mobile devices in an enterprise. A MAM policy server 135 may communicate with end user devices, systems, and/or work production servers where an end user (e.g., employee, customer, etc.) performs and/or plans work. The MAM policy server may communicate with various modules/applications used by an end user in performing work, planning work, and interacting with enterprise resources, which includes, but is not limited to, a calendar system, collaboration wiki system, email system, enterprise social media system, content management system, sales systems, accounting systems, and the like, to establish a baseline profile for the use of mobile devices in the enterprise. The metrics obtained from these information sources for the respective users can be used to establish a set of seed policies for the enterprise which may be provided by the MAM policy server 135 for deployment in the enterprise. Changes or exceptions to the seed policies may be made based on requests from users and/or data collected over time indicating that a particular policy incurs too great of a productivity cost for the security benefit or, vice versa, that the policy results in too great of a security risk based on the productivity benefit.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
performing operations as follows on a processor:
monitoring use of resources in an enterprise by mobile devices;
receiving metrics from the mobile devices and an enterprise server, the metrics being associated with the use of the resources in the enterprise based on monitoring the use of the resources; and
automatically generating a policy that restricts use of the resources in the enterprise based on the metrics, a predicted user productivity cost associated with the policy, and a predicted security cost associated with the mobile devices when the policy is not enforced;

wherein the metrics are first metrics, the method further comprising:

monitoring use of resources in the enterprise via the mobile devices when the policy is enforced;

receiving second metrics from the mobile devices and the enterprise server, the second metrics being associated with the use of the resources in the enterprise based on monitoring the use of the resources when the policy is enforced; and generating a score based on the second metrics that were received that is indicative of a user productivity cost associated with the policy.

2. The method of claim 1, further comprising:
generating a score that is indicative of a security cost associated with the mobile devices when the policy is not enforced.

3. The method of claim 2, further comprising:
comparing the score that is indicative of the user productivity cost associated with the policy with the score that is indicative of the security cost associated with the mobile devices when the policy is not enforced; and
generating a recommendation whether to enforce the policy.

4. The method of claim 1, wherein the metrics comprise quantitative and qualitative metrics.

5. The method of claim 4, wherein generating the score based on the metrics comprises:
generating a first score based on the quantitative metrics that were received that is indicative of the user productivity cost associated with the policy;
generating a second score based on the qualitative metrics that were received that is indicative of the user productivity cost associated with the policy; and
combining the first score and the second score.

6. The method of claim 1, further comprising:
receiving a request to modify the policy from a user of one of the mobile devices; and
determining whether to grant the request based on a comparison of a productivity benefit associated with the request with a security cost associated the request.

7. The method of claim 6, wherein the request to modify the policy comprises a request to cease enforcement of the policy for a defined time period.

8. The method of claim 1, wherein the policy is applicable to users of the mobile devices belonging to a same class with other users of the mobile devices not belonging to the class being exempt from the policy.

9. The method of claim 1, wherein the policy is applicable to an individual user of one of the mobile devices with other users of the mobile devices being exempt from the policy.

10. A system, comprising:
a processor; and
a memory coupled to the processor and comprising computer readable program code embodied in the memory that when executed by the processor causes the processor to perform operations comprising:
monitoring use of resources in an enterprise by mobile devices;
receiving metrics from the mobile devices and an enterprise server, the metrics being associated with the use of the resources in the enterprise based on monitoring the use of the resources; and
automatically generating a policy that restricts use of the resources in the enterprise based on the metrics, a predicted user productivity cost associated with the policy, and a predicted security cost associated with the mobile devices when the policy is not enforced;

wherein the metrics are first metrics, the operations further comprising:

monitoring use of resources in the enterprise via the mobile devices when the policy is enforced;

receiving second metrics from the mobile devices and the enterprise server, the second metrics being associated with the use of the resources in the enterprise based on monitoring the use of the resources when the policy is enforced; and generating a score based on the second metrics that were received that is indicative of a user productivity cost associated with the policy.

11. The system of claim 10, wherein the operations further comprise:
generating a score that is indicative of a security cost associated with the mobile devices when the policy is not enforced.

12. The system of claim 11, wherein the operations further comprise:
comparing the score that is indicative of the user productivity cost associated with the policy with the score that is indicative of the security cost associated with the mobile devices when the policy is not enforced; and
generating a recommendation whether to enforce the policy.

13. The system of claim 10, wherein the metrics comprise quantitative and qualitative metrics.

14. A computer program product, comprising:
a non-transitory computer readable storage medium comprising, computer readable program code embodied in the medium that when executed by a processor causes the processor to perform operations comprising:
monitoring use of resources in an enterprise by mobile devices;
receiving metrics from the mobile devices and an enterprise server, the metrics being associated with the use of the resources in the enterprise based on monitoring the use of the resources; and
automatically generating a policy that restricts use of the resources in the enterprise based on the metrics, a predicted user productivity cost associated with the policy, and a predicted security cost associated with the mobile devices when the policy is not enforced;

wherein the metrics are first metrics, the operations further comprising:

monitoring use of resources in the enterprise via the mobile deuces when the policy is enforce;

receiving second metrics from the mobile devices and the enterprise server, the second metrics being associated with the use of the resources in the enterprise based on monitoring the use of the resources when the policy is enforced; and generating a score based on the second metrics that were received that is indicative of a user productivity cost associated with the policy.

15. The computer program product of claim 14, wherein the operations further comprise:
generating a score that is indicative of a security cost associated with the mobile devices when the policy is not enforced.

16. The computer program product of claim 15, wherein the operations further comprise:
comparing the score that is indicative of the user productivity cost associated with the policy with the score that is indicative of the security cost associated with the mobile devices when the policy is not enforced; and generating a recommendation whether to enforce the policy.

17. The computer program product of claim 14, wherein the metrics comprise quantitative and qualitative metrics.

* * * * *